United States Patent
Hannu et al.

(10) Patent No.: US 8,554,257 B2
(45) Date of Patent: Oct. 8, 2013

(54) SYSTEM CONDITION BASED ADAPTIVE REFERENCE POWER OFFSET POSITIONING

(75) Inventors: Hans Hannu, Luleá (SE); Mårten Ericson, Luleá (SE); Peter Ökvist, Luleá (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1155 days.

(21) Appl. No.: 12/191,101

(22) Filed: Aug. 13, 2008

(65) Prior Publication Data
US 2010/0041427 A1 Feb. 18, 2010

(51) Int. Cl.
H04B 7/00 (2006.01)
(52) U.S. Cl.
USPC ............ 455/522; 455/69; 455/70; 455/452.1; 455/452.2; 370/318; 370/319; 370/320
(58) Field of Classification Search
USPC ...................... 455/522, 69–70, 452.1, 452.2; 370/318–320
See application file for complete search history.

(56) References Cited

U.S. PATENT DOCUMENTS

| | | | | |
|---|---|---|---|---|
| 7,274,912 B2 * | 9/2007 | Sommer | .......... | 455/69 |
| 7,373,161 B2 * | 5/2008 | Anderson | .......... | 455/522 |
| 7,418,010 B2 * | 8/2008 | Cai et al. | .......... | 370/498 |
| 7,733,823 B2 * | 6/2010 | Kim et al. | .......... | 370/328 |
| 8,060,127 B2 * | 11/2011 | Anderson | .......... | 455/522 |
| 8,320,307 B2 * | 11/2012 | Niwano | .......... | 370/329 |
| 2003/0148781 A1 * | 8/2003 | Sommer | .......... | 455/522 |
| 2003/0210712 A1 * | 11/2003 | Cai et al. | .......... | 370/498 |
| 2004/0043783 A1 * | 3/2004 | Anderson | .......... | 455/522 |
| 2004/0102205 A1 * | 5/2004 | Zhang et al. | .......... | 455/522 |
| 2005/0099968 A1 | 5/2005 | Yamano | | |
| 2005/0249154 A1 * | 11/2005 | Kim et al. | .......... | 370/328 |
| 2010/0202363 A1 * | 8/2010 | Kim et al. | .......... | 370/328 |

FOREIGN PATENT DOCUMENTS

| | | | |
|---|---|---|---|
| EP | 1 672 941 A1 | 6/2006 |
| EP | 1 699 144 A2 | 9/2006 |

OTHER PUBLICATIONS

3GPP TS 25.321 V6.13.0, 3rd Generation Partnership Project; Technical Specification Group Radio Access Network; Medium Access Control (MAC) protocol specification (Release 6), Jun. 2007, 94 pages.
3GPP TS 25.331 V6.14.0, 3rd Generation Partnership Project; Technical Specification Group Radio Access Network; Radio Resource Control (RRC); Protocol Specification (Release 6), Jun. 2007, 1247 pages.

(Continued)

Primary Examiner — Fayyaz Alam
(74) Attorney, Agent, or Firm — Nixon & Vanderhye, P.C.

(57) ABSTRACT

Within a cell area, an RBS typically provides communication services to UEs. During operation, the UE adjusts its transmission power according to a transmission parameter value such as the E-TFCI. The RBS provides a predetermined number of reference points for E-TFCI that covers the limited range. For any intermediate values not specifically provided, the UE calculates the SIR through interpolation. The RBS predicts a range of transmission power likely to be used by the UE and provides the reference points based on the prediction. The prediction is performed based on operational measurement.

30 Claims, 16 Drawing Sheets

(56) References Cited

OTHER PUBLICATIONS

3GPP TS 25.214 V6.11.0, $3^{rd}$ Generation Partnership Project; Technical Specification Group Radio Access Network; Physical layer procedures (FDD) (Release 6), Dec. 2006, 60 pages.

International Search Report and Written Opinion dated Dec. 21, 2009 (15 pages total).

3GPP TSG-RAN WG1 Meeting #53bis—R1-082704, Warsaw, Poland, Jun. 30-Jul. 4, 2008, "Introduction of Dual-Cell HSDPA Operation on Adjacent Carriers" (82 pages).

* cited by examiner

SYSTEM CONDITION BASED ADAPTIVE REFERENCE POWER OFFSET POSITIONING

TECHNICAL FIELD

The disclosed technology generally relates to method(s) and apparatus(es) for adaptively determining transmission power levels for user equipments in a wireless network.

BACKGROUND

Mobile broadband services over cellular systems are gaining momentum with the introduction of HSPA (High Speed Packet Access) radio bearers in networks. There is also an increased interest in IMS (IP Multimedia Subsystem) based services, such as VoIP (Voice over IP), PoC (Push-to-talk over Cellular) and presence. HSPA introduces the possibility of downloading and uploading data with speeds of several Mbits/s.

As traffic demands increase, the networks are planned denser. A general trend is to move antennas down from radio towers to building rooftops, and even down to the street level, to support higher end-user bit rate and system capacity demands. For street-level users, the propagation environment has changed to often comprise LOS (line of sight) situations. Moving antennas downs can result in less coverage per cell, but a significant increase in cell capacity can also occur due to lower interference. In general, the orthogonality is better when the channel consists of fewer taps.

In a scenario where the interference from other cells is minor, given a fixed SIR (Signal to Interference Ratio) target, changed channel orthogonality forces the DPCH (Dedicated Physical Channel) power to change accordingly. When a UE increases its power, the overall interference is increased, thus the cell can serve fewer UEs. In another scenario, if the interference from other cells is significant, a change in orthogonality will not be as significant for the cell capacity.

In any wireless network including an HSPA network, the following goals are desired among others—high throughput, high quality (less errors) and large number of users. In many ways, these are competing goals necessitating tradeoffs. For example, to achieve high throughput, the speed of data transmission can be increased. But this generally corresponds to higher rate of errors. To reduce errors (i.e., achieve high quality), a robust modulation scheme can be utilized, but this generally reduces throughput. One can increase transmission power of a UE to increase throughput and/or reduce errors, but this increases interferences for other UEs which reduces throughput and/or quality of their transmissions.

SUMMARY

Within a cell area, a radio base station typically provides communication services to plural user equipments. Depending on the type of service provided, the bandwidth requirements are different. An example of a low bandwidth services include VoIP and an example of a high bandwidth service includes video streaming. The advent of HSPA allows for widely varying bandwidth communications to take place between a user equipment and a base station.

There are at least two factors that drive the transmission power requirements of the user equipment—the required bandwidth and quality of service (QoS). The QoS is mainly driven by a desired quality level and by environmental factors (mainly noise interference) that affect the quality.

Generally, a low bandwidth service requires a relatively low transmission power and high bandwidth service requires a relatively high transmission power from the user equipment. Also generally, higher desired service quality generally requires higher transmission power. Signal-to-interference Ratio (SIR) could be a measure of quality. Higher SIR results in less transmission errors.

During operation, the user equipments adjust transmission power according to a power offset parameter value—e.g., the power gain factor of an E-TFCI. There are 127 E-TFCIs. Generally, higher B-TFCI values indicate higher SIR. However, the correspondence is not one-to-one between E-TFCI and the used SIR. The user equipment receives information related to the E-TFCI values from the radio base station. However, information about all 127 values is not provided—this would be expensive and time consuming.

Instead, the radio base station provides a predetermined number (typically 4-6) of reference points that typically covers the entire range of the E-TFCI values. For any intermediate SIR values not specifically provided, the user equipment determines the E-TFCI value, usually through linear interpolation. Linear interpolation between points spread wide apart is generally inaccurate.

In an example method, the base station predicts a range of transmission parameter values likely to be used by the user equipment for transmission. The base station provides a predetermined number (4, 6, 8, etc.) of E-TCFI reference points within this range to the user equipment. In effect, the base station narrows the range for which the reference points are determined and provided to the user equipment. When the range is narrowed, any interpolation within the narrowed range will be closer to the actual desired SIR than when interpolation is performed over a wide range.

The prediction is performed by the base station based on system factors such as noise rise, interference headroom, network layout, position of the user equipment, admission control parameters of the network, number of currently connected user equipment, scheduler type, radio channel environment, service type, and the like.

DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope.

In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks labeled or described as "processors" or "controllers" may be provided through the use of dedicated hardware as well as hardware capable of executing software in association with appropriate software. When provided by a processor, the functions may be provided by a single dedicated processor, by a single shared processor, or by a plurality of individual processors, some of which may be shared or distributed. Moreover, explicit use of the term "processor" or "controller" should not be construed to refer exclusively to hardware capable of executing software, and may include, without limitation, digital signal processor (DSP) hardware, read only memory (ROM) for storing software, random access memory (RAM), and non-volatile storage.

Figure 1:
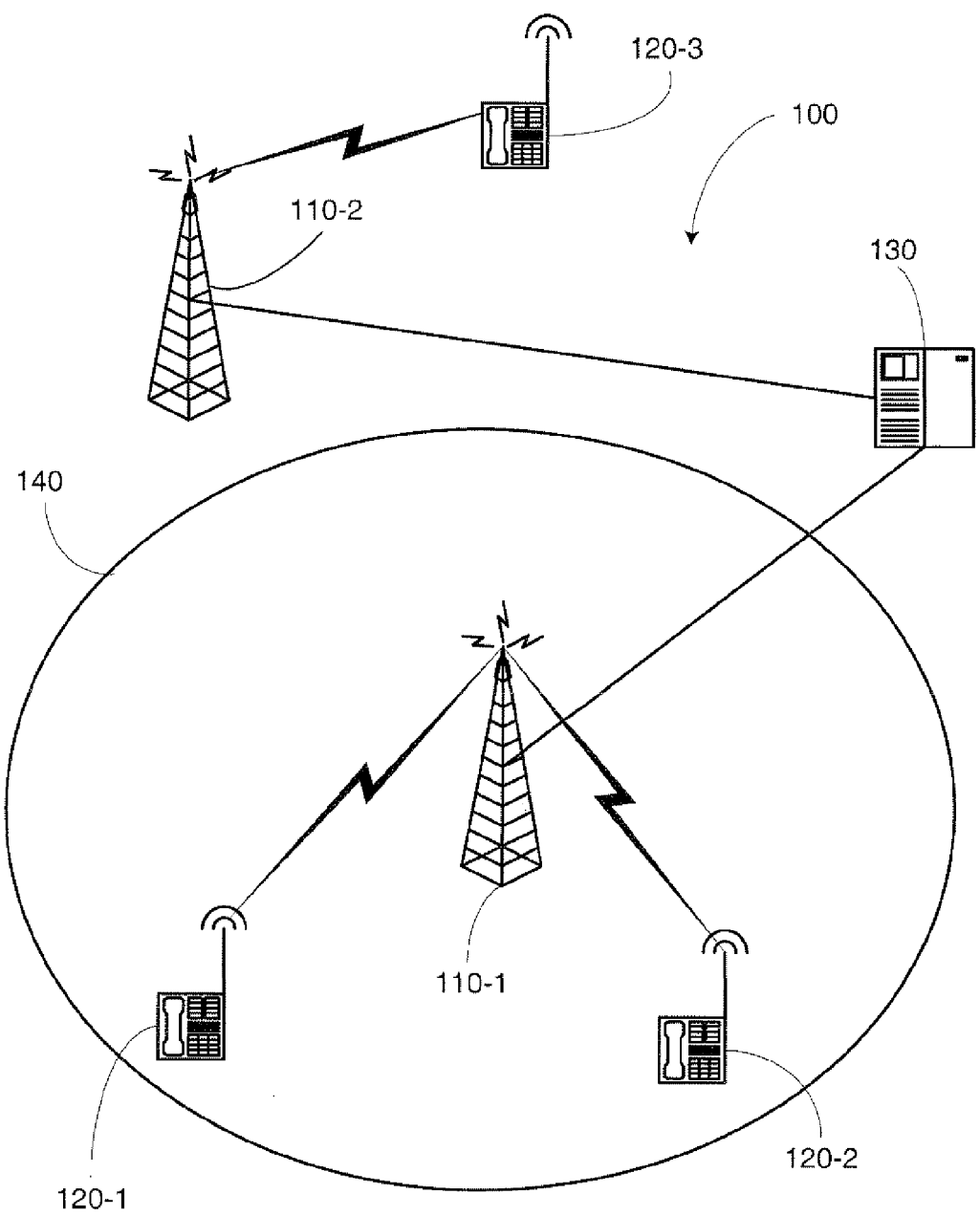
FIG. 1 illustrates an example mobile broadband wireless network.

An example mobile broadband wireless communication system 100 is illustrated in FIG. 1 which includes RBSs (radio base stations) 110-1, 110-2 also referred to as Node Bs; UEs (user equipments) 120-1, 120-2, 120-3; and RNC (radio network controller) 130. In FIG. 1, the RBS 110-1 provides communication services to the UEs 120-1, 120-2 within a cell 140. The RBS 110-2 provides services to the UE 120-3 within its own cell (not shown). The UEs may be a mobile cellular telephone, a PDA (Personal Digital Assistant), a laptop, a computer or any similar arrangement for radio communication.

In the network 100, the RNC 130 acts as a governing element responsible for control of the RBSs 110-1, 110-2. The RNC 130 may carry out radio resource management; some of the mobility management functions and may also be the point where encryption is performed before user data is sent to and from the CEs 120-1, 120-2 and 12-3.

Either the RNC 130 or the RBSs 110-1, 110-2 may determine the transmission parameter reference points, e.g., the E-TFCI reference points, provided to the UEs 120-1, 120-2 and 12-3, which will be described in detail below. The wireless network 100 may be based on technologies such as CDMA (Code Division Multiple Access), WCDMA (Wideband Code Division Multiple Access), EUL (Enhanced UpLink, a.k.a. HSUPA, High Speed Uplink Packet Access) WCDMA, CDMA 2000, High Speed Packet Data Access (HSPA), (including EUL and HSDPA), EVDO version of CDMA 2000, etc.

Radio signals are sent from a UE 120 (e.g., UE 120-1) over a radio link and are received by an RBS 110 (e.g., RBS 110-1). The power of the signal, which may be too high or too low to be suitable for communication, is adjustable by the RBS 110 by running, for example, an inner loop power control, also called fast power control. The fast power control may run both on signals sent from the UE 120 to the RBS 110 (the uplink signals) and from the RBS 110 to the UE 120 (the downlink signals). One aim of uplink and downlink fast power control is to counter the effect of fast fading, while maintaining a desired SIR target. Another is to compensate for the near-far problem, so that a signal received from users far out in the cell are not swamped out by a stronger signal.

As noted above, there are competing goals such as high throughput, high quality, and high number of UEs being served. It is desirable to control the transmission power levels of the UEs so that an optimum combination of the goals can be achieved. Further, because the situations change dynamically—number of UEs, locations of the UEs, types of services demanded, etc.—it is also desirable adaptively control the power levels.

In wireless networks, a number of channels are included to control signaling and data transport. In HSPA, some important transport channels in DL (downlink) are HS-DSCH (High Speed Downlink Shared Channel), A-DPCH (Associated Dedicated Physical Channel), HS-SCCH (High Speed Control Shared Channel), E-AGCH (E-DCH (Enhanced Dedicated Channel) Absolute Grant Channel), E-RGCH (E-DCH Relative Grant Channel) among others. The HS-DSCH is used to transport data in the DL; A-DPCH is used to transport TPC (Transmit Power Control) bits and pilot bits in DL, and may also be used to carry RRC (Radio Resource Control) signaling such as handover commands to the UE (user equipment); HS-SCCH is used to schedule users in the DL; and E-AGCH is used to carry "absolute grants", which is a type of scheduling information, in the DL.

Some important channels in UL (uplink) are DPCCH (Dedicated Physical Control Channel), E-DPCCH (E-DCH Dedicated Physical Control Channel) and E-DPDCH (E-DCH Dedicated Physical Data Channel). DPCCH is used to carry the TPC commands for the downlink and also the pilot bits for channel estimation; E-DPCCH is used to carry uplink control signaling such as which E-TFCI (E-DCH Transmit Format Combination Index) the UE uses in this TTI (Transmission Time Interval); and E-DPDCH is used to carry actual user data.

The DPCCH of a UE is power controlled by a RBS serving the UE with a fast power control geared towards a particular SIR-target. Referring back to FIG. 1, the RBS 110 may estimate a SIR value based on some known reference signals such as pilot symbols and compare it with some SIR target corresponding to a given quality of service target such as BLER requirements, spreading factor used, BER requirements, HARQ requirements, and the like.

Uplink SIR may be measured on the DPCCH, which comprises pilots and TPC commands for downlink power control. If the measured SIR is lower than the SIR target, then the fast power control at the RBS 110 may generate and send UP command to the UE 120. Conversely, if the measured SIR is higher than SIR target then the RBS 110 may generate and send DOWN command to the UE 120. In response, the UE 120 will increase, in case of UP command, or decrease, in case of DOWN command, its uplink transmit power.

OLPC (outer-loop power control) can also be used by the RBS 110 and/or the UE 120 to meet the desired quality of service targets. The OLPC may be implemented to meet the uplink and downlink quality targets. It is desirable that despite varying radio conditions, which is often the case in wireless networks, the OLPC is able to maintain the desired quality of service target.

The quality target may be set by the network 100 and it is expected that the RBS 110 will operate to ensure the desired quality of service is met throughout a communication session between the RBS 110 and the UE 120. The value of the quality target set may depend upon the type of service, such as speech, packet data, video data, etc., which in turn impacts the SIR target used for the fast power control. Thus, an adequate power level for providing the quality target of the radio link can be achieved, during normal signal radio signal conditions.

Referring back to FIG. 1, the DPCCH of the UEs 120 can be controlled by the RBSs 110. The SIR-target is set by the OLPC to achieve a particular quality by the RBS for example. The quality target may be expressed in BLER (block error rate), BER (bit error rate), number of HARQs (hybrid automatic retransmission requests), and the like.

Figure 2:
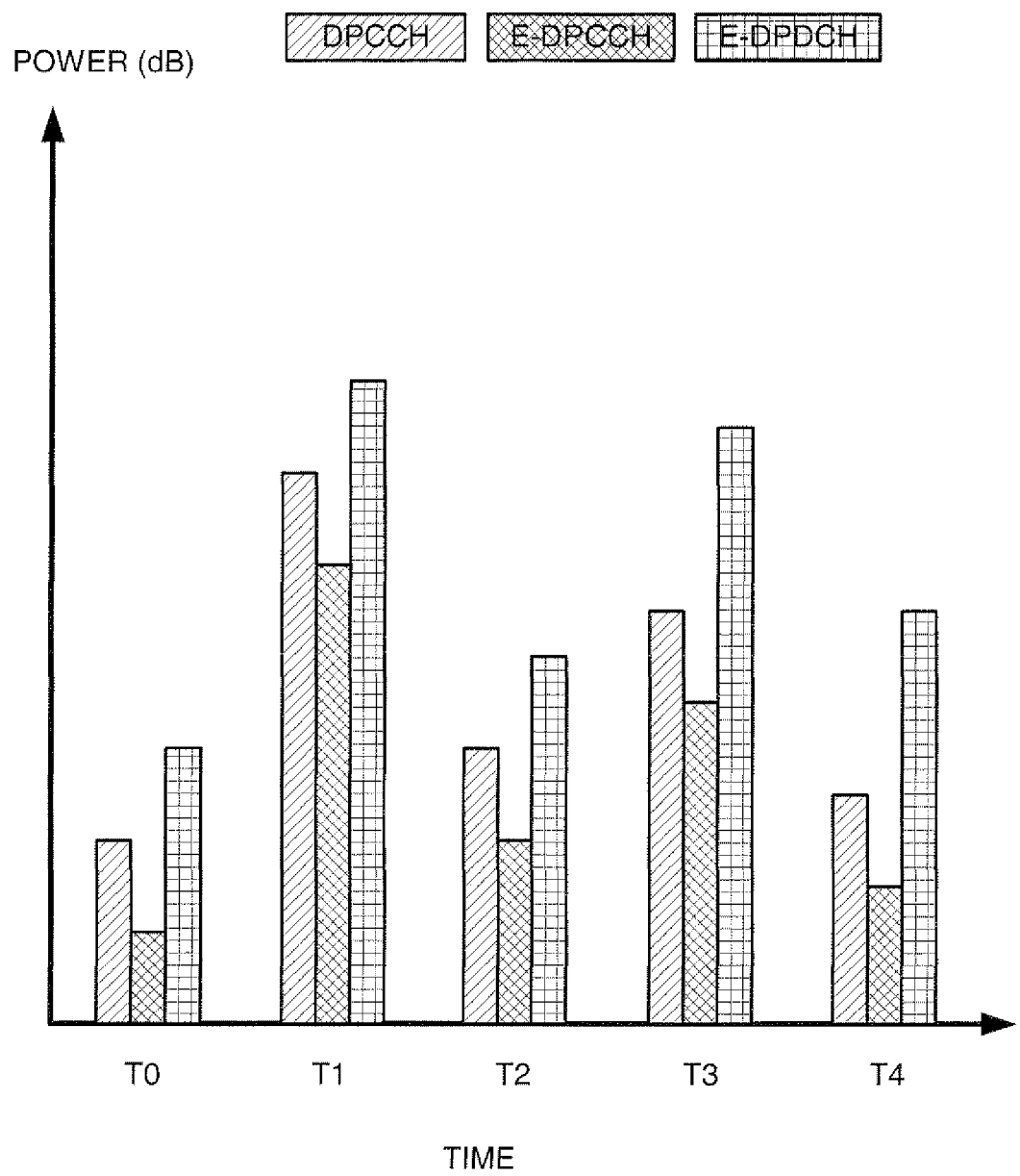
FIG. 2 which illustrates transmission power relationships between control and data channels for uplink.

For the uplink channels—transport channels from the UEs to the RBSs—the power of the E-DPCCH is set relative to the DPCCH with some specific offset. This is demonstrated with reference to FIG. 2 which illustrates transmission power relationships between DPCCH, E-DPCCH and E-DPDCH. In FIG. 2, the DPCCH is adapted to control the data transfer over the E-DPCCH and the E-DPDCH. As shown in FIG. 2, the transmit power levels may vary over time, but the difference in amplitude between the DPCCH and the E-DPCCH remain substantially constant. The difference between the transmit power levels of the DPCCH and the E-DPCCH, and also other channels (e.g., E-DPDCH) that may be involved in the signaling between the RBS 110 and the UE 120 is sometimes referred to as the power offset, or the gain factor, or β-factor. In this instance, by knowing the power level of the DPCCH and the E-DPCCH power offset, the power level of the E-DPCCH can be determined.

Like the E-DPCCH, the power level of E-DPDCH can also be set relative to the DPCCH. But in addition, the power level of the E-DPDCH is also dependent on the E-TFCI which may have different power offsets. Referring again to FIG. 2, the E-TFCI value in time intervals T0, T1 and T2 is the same. But at time interval T3, the E-TFCI value changes resulting in a different power offset for E-DPDCH. One reason for this is that different E-TFCIs can represent different possible bit rates (i.e. packet sizes per TTI), and higher bit rate requires usually higher "power", i.e. higher power offset, to have each packet successfully decoded in the base station.

The UE can choose between 127 E-TFCIs (see 3GPP TS 25.321 V6.13.0 (2007-06)) depending on the amount of data in the transmit buffer and available power. Transferring power offset information for 127 E-TFCIs from the network to the UE (from the RBS to the US) would be both time and resource consuming. Instead the network signals a number of reference E-TFCIs to the UE that it would use to interpolate (or use other similar methods) to obtain a suitable E-DPDCH power offset for its choice of E-TFCI for the next transmission.

The network signals the E-TFCI reference points during radio link setup and radio link reconfiguration. Via the RRC connection between the RNC and UE (see 3GPP TS 25.331 V6.14.0 (2007-06)), information elements such as given below, are passed to the UE via the RRC protocol. The radio bearer setup message contains the information element (see section 10.3.6.99 of 3GPP TS 25.321 V6.13.0 (2007-06)) which contains information about reference E-TFCIs and the corresponding reference E-TFCI power offsets.

| IE/Group Name | Presence | Range | IE Type and Reference | Semantics Description |
|---|---|---|---|---|
| E-TFCI Table Index | M | | INTEGER (0 ... 1, ...) | Indicates which standardised E-TFCS Transport Block Size Table shall be used. |
| E-DCH Minimum Set E-TFCI | O | | INTEGER (0 ... 127) | For the concept of "E-DCH Minimum Set of TFCs" |
| Reference E-TFCI Information | | 1 ... <maxnoofRefETFCIs> | | |
| >Reference E-TFCI | M | | INTEGER (0 ... 127) | |
| >Reference E-TFCI Power Offset | M | | See specification, section 9.2.2.13Dp | |

What is actually sent in the reference E-TFCI power offset field is an index to a table which contains standardized offset values. The UE uses interpolation to find the power offset to use for a certain E-TFCI based on the received reference E-TFCIs. However, measurements indicate that there is not a one-to-one relationship between E-TFCI and required SIR. Hence, using a limited set of reference E-TFCIs leads to less efficient power offset settings depending on the placement of the E-TFCIs, and can lead to lower capacity and/or system throughput.

Thus, the gain factor used in actual data transmission may be inaccurate, which in turn will affect the overall system performance. For example, when the gain factor is lower than required, more transmission attempts are necessary to guarantee a successful transmission. Since the OLPC may be based on transmission attempts, this may result in that the SIR target is increased and more power is allocated to the DPCCH, which is undesirable.

More specifically, with a significant difference in required SIR between two different formats, once the steady-state SIR target is reached (or is close to reaching the steady-state target), certain amount of used power is wasted if a "cheaper", i.e. lower power required, format is used for transmission. The power is wasted since the resulting SIR is much higher than the required SIR.

On the other hand, one can aim for transmission that is "X" dB too low for a "more expensive" format. In this instance, OLPC up-steps will almost certainly be triggered. If the visit to the "more expensive" format is short, unnecessary up-steps can be costly to the system since the system is stuck with unnecessarily high SIR-target during the time it takes for the OLPC to reduce the SIR-target back to normal levels. This problem can be very severe when a UE changes to a smaller format which requires higher SIR.

Using a limited set of reference E-TFCIs (i.e. reference transmission parameter values) may therefore provide less efficient power offset settings depending on the placement of the reference points. The "placement" of a specific reference factor is intended to convey to which E-TFCI (0 . . . 127) the reference value is associated. The less efficient power offset setting results in less system capacity, less system throughput and less coverage.

Figure 3:
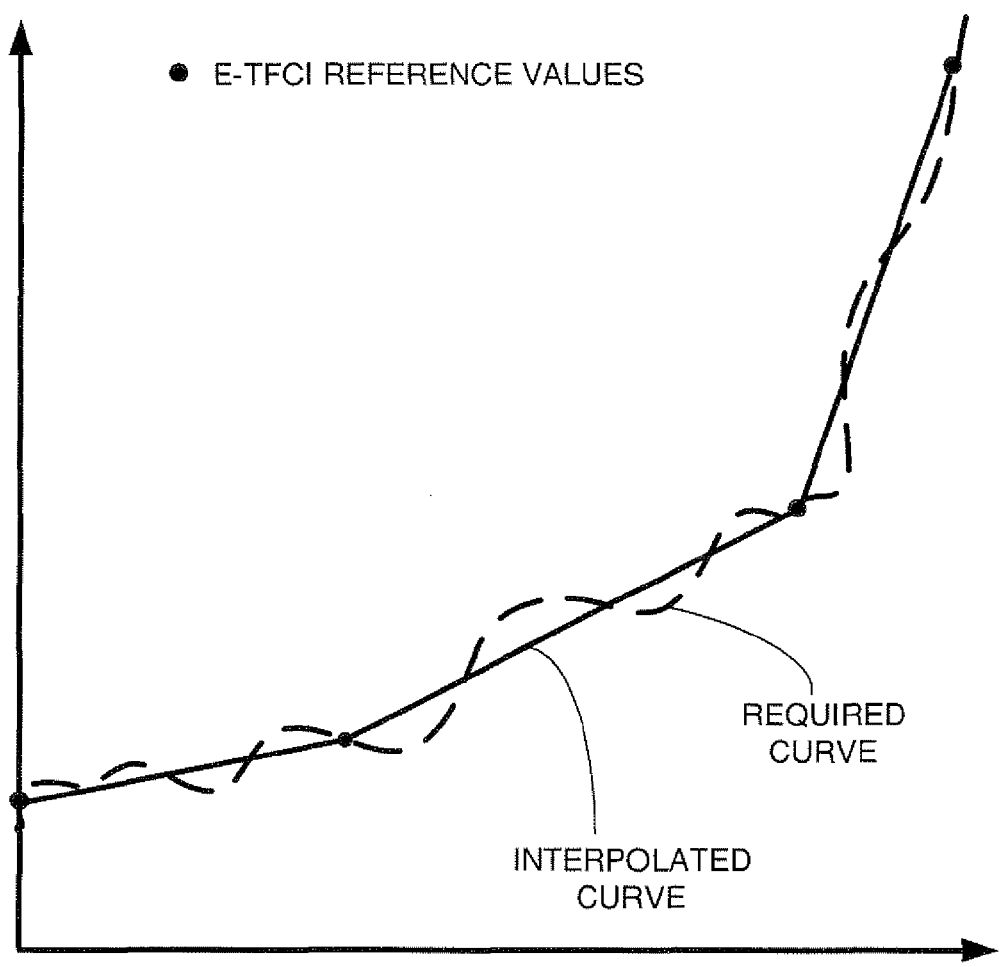
FIG. 3 illustrates an example relationship between E-TFCI and SIR.

FIG. 3 exemplifies a relationship between E-TFCI, required SIR and the resulting SIR curve due to interpolation between given reference E-TFCIs. The horizontal axis represents the E-TFCI values and the vertical axis represents the required SIR values. The dashed line curve represents the actual SIR curve and the solid line curve represents a linearly interpolated SIR curve given four reference points as indicated by solid dots.

Figure 4A:
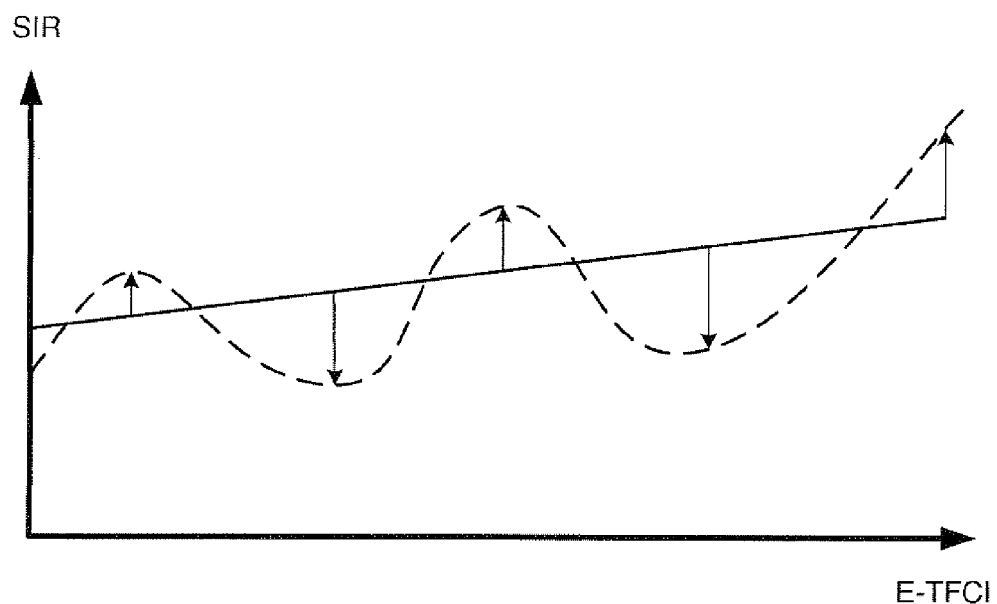
FIGS. 4A and 4B illustrates inaccuracies between the true SIR and calculated SIR resulting from interpolations.
Figure 4B:
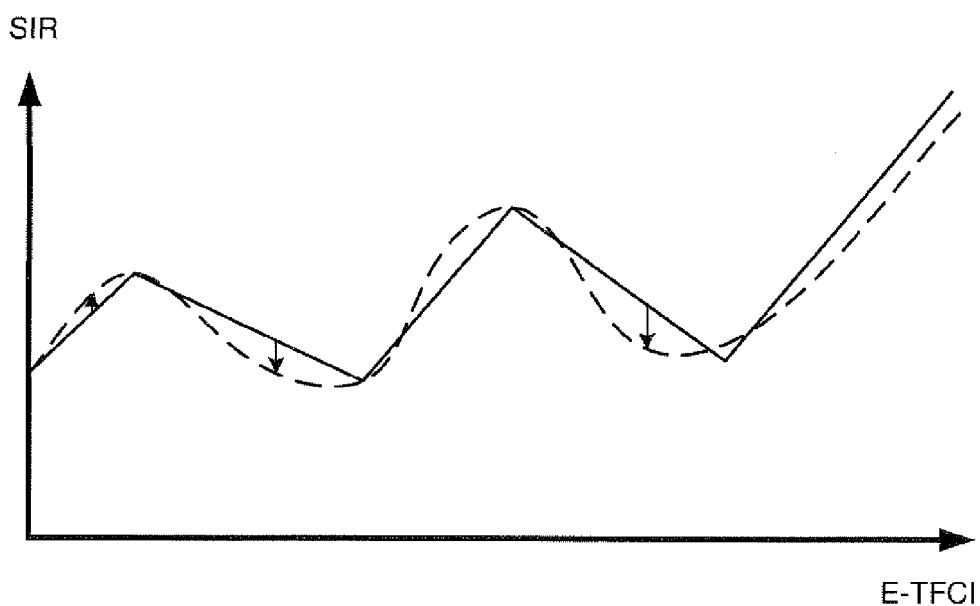

Most, if not all, forms of interpolation include errors. The errors are more pronounced as the separation between interpolation points increase. This is demonstrated with FIGS. 4A and 4B. In these figures, the true SIR curves are represented with dashed curves. In FIG. 4A, it is assumed that only two reference points are provided and the straight line represents the linear interpolation between the two reference points. In FIG. 4B, six reference points are provided and the solid line again represents linear interpolation. Once can readily see that the errors (represented by the arrows) decrease as more interpolation points are provided over a same range. That is, within a given range of E-TFCI, providing reference values closely spaced together provides better accuracy within the given range.

Thus, in one aspect, the network provides a predetermined number (e.g., four) of SIR curve reference values to the UE over a smaller range of E-TFCI instead of providing the same number of reference values covering the entire 127 E-TFCI values. The smaller range is determined by the network, e.g., the RBS, based on a prediction of which transmission parameter values (e.g., E-TFCI values) likely to be used by the UE for transmission. Within the smaller range, the reference points are more closely spaced together to thereby increasing the accuracy of interpolation.

The determination of reference points is explained in conjunction with FIGS. 5A, 5B, 5C and 5D. In these figures, the predetermined number of reference points provided is assumed to be four. It should be noted that any number of reference points may be provided. The trade off being that more reference points increase the accuracy at the cost of increased resource usage for signaling.

The RBS 110 can continuously measure and estimate several different measurements to provide input to a reference points selection mechanism. System characteristics such as noise rise, interference headroom, position(s) of the UEs, the time of day, number of UEs connected to the RBS, admission control parameters), scheduler parameters), radio channel environment, service type of the wireless service being provided to the UE(s) 120, and the like can be used as input to the function of choosing suitable reference points. The measurements may then be used to classify the radio, load and/or network conditions, representing different noise rise levels, of the cell to be for example good/medium/bad. Other input measures might include the cell size (network layout) and what radio conditions that is present in the cell (delay spread and/or orthogonality factor).

Figure 5A:
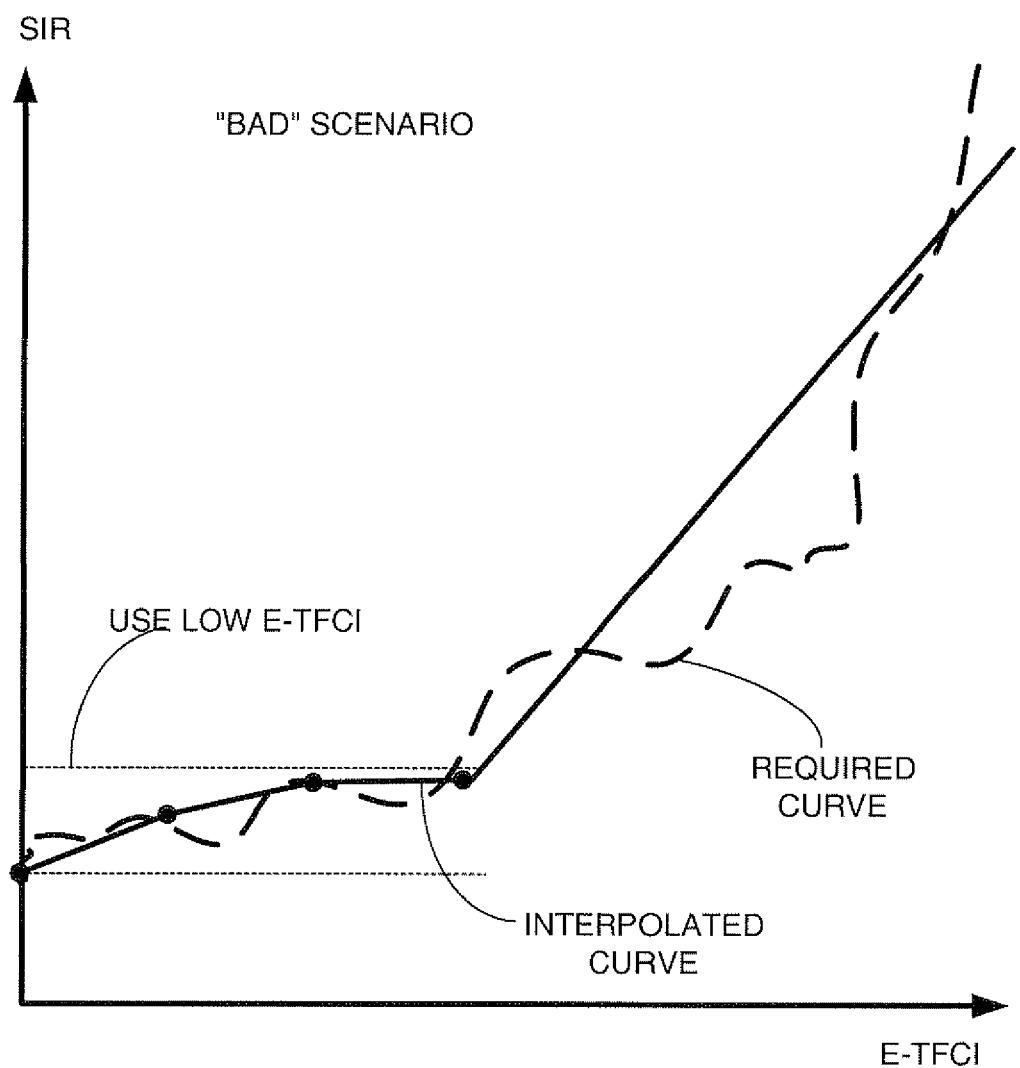
FIGS. 5A, 5B, 5C and 5D illustrate determining ranges of reference points for SIR curve interpolation.

If the scenario is classified as "bad", the cell may have high noise rise, the cell may be very large cell, there may be many simultaneous users, and the like. The power offset reference points selected should then be based on a limited range of possible transmission parameter values in an adequate power-requirement interval, to provide more accurate transmission power offsets in that range. FIG. 5A illustrates such a "bad" scenario assuming that the E-TFCIs represent the indices to the transmission parameter values. In this instance, lower E-TFCIs are more probable. Thus, the reference points are concentrated in the low E-TFCI region.

Figure 5B:
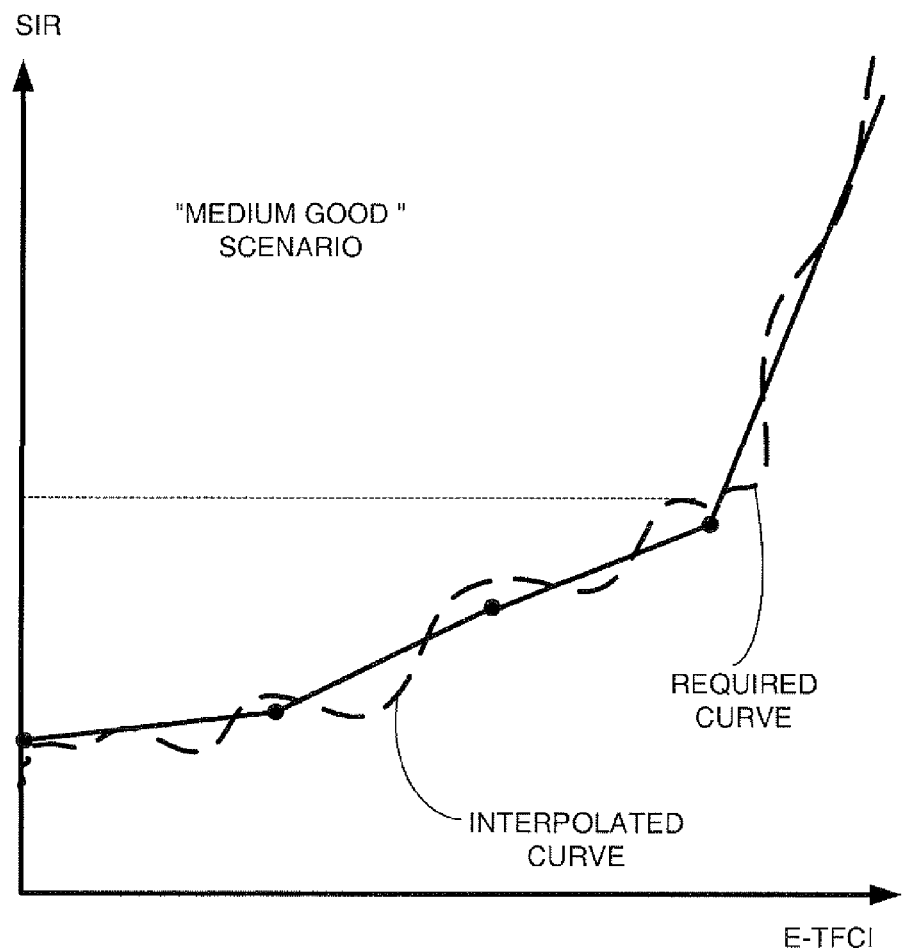
Figure 5C:
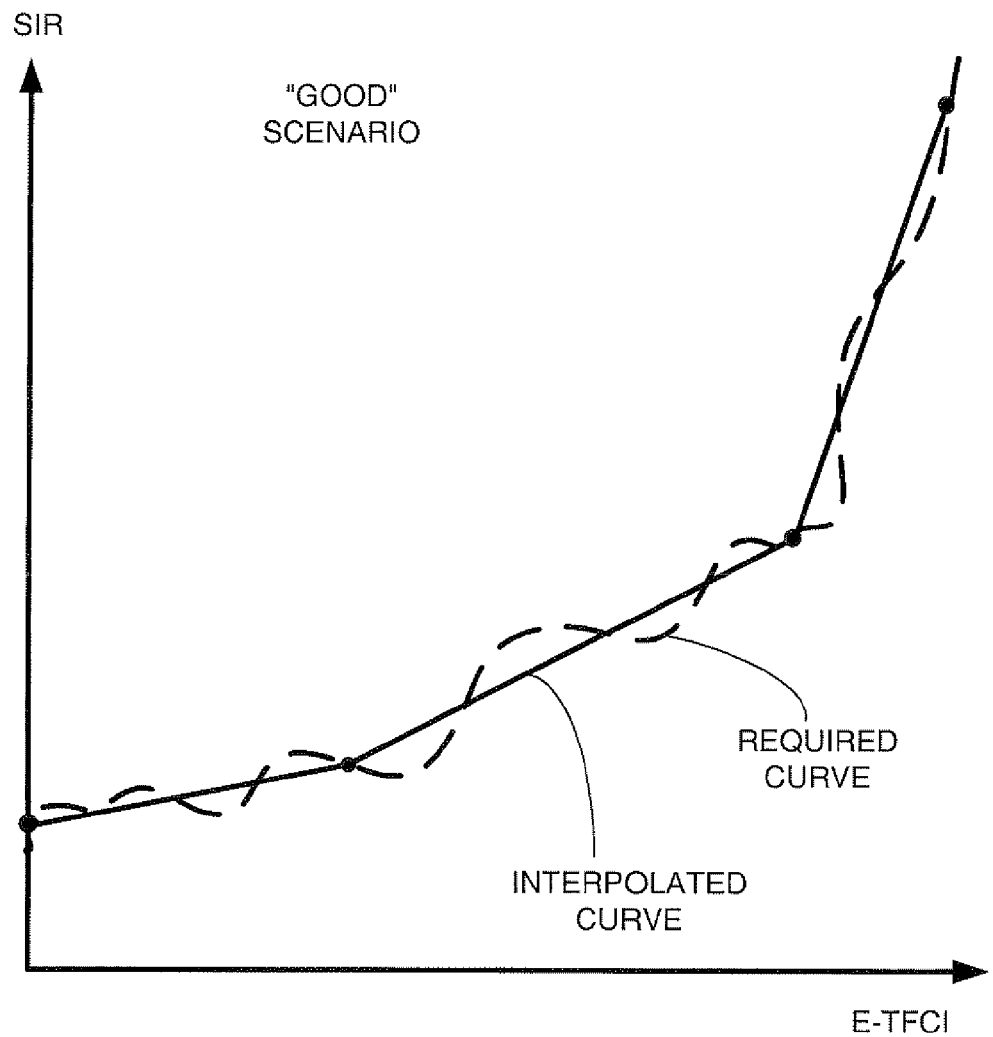

In FIG. 5B, a "medium good" scenario is illustrated. There may be less background noise, there may be less number of UEs in the cell, or the cell may be of a more moderate size. Here, the reference points are provided to cover a larger range. FIG. 5C represents a "good" scenario in which all E-TFCIs are probable, and thus, the four reference points are selected to cover all E-TFCIs.

Figure 5D:
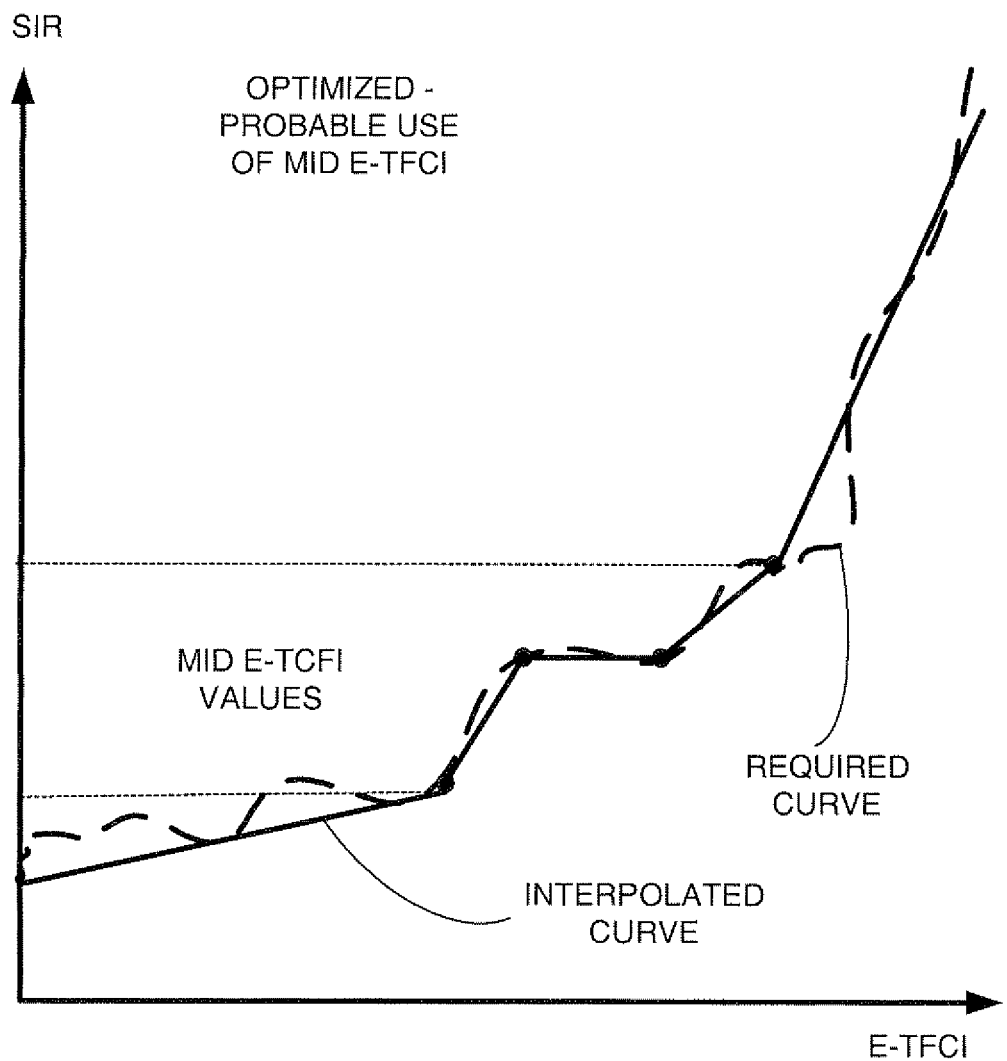

The range of transmission parameter values covered by the reference points need not always include the lowest parameter value such as illustrated in FIGS. 5A, 5B and 5C. The range can cover a range that is not inclusive of the low and/or the high values as illustrated in FIG. 5D. This can happen due to type of service being provided. For example, if the service being provided is VoIP, then it is more likely that bandwidth provided through low range of E-TFCI values is sufficient. On the other hand, if a video streaming service is being provided, then only the highest E-TFCI values may be called for. WWW service falls somewhere in between and thus some mid range of E-TFCI values may be more likely.

Figure 6:
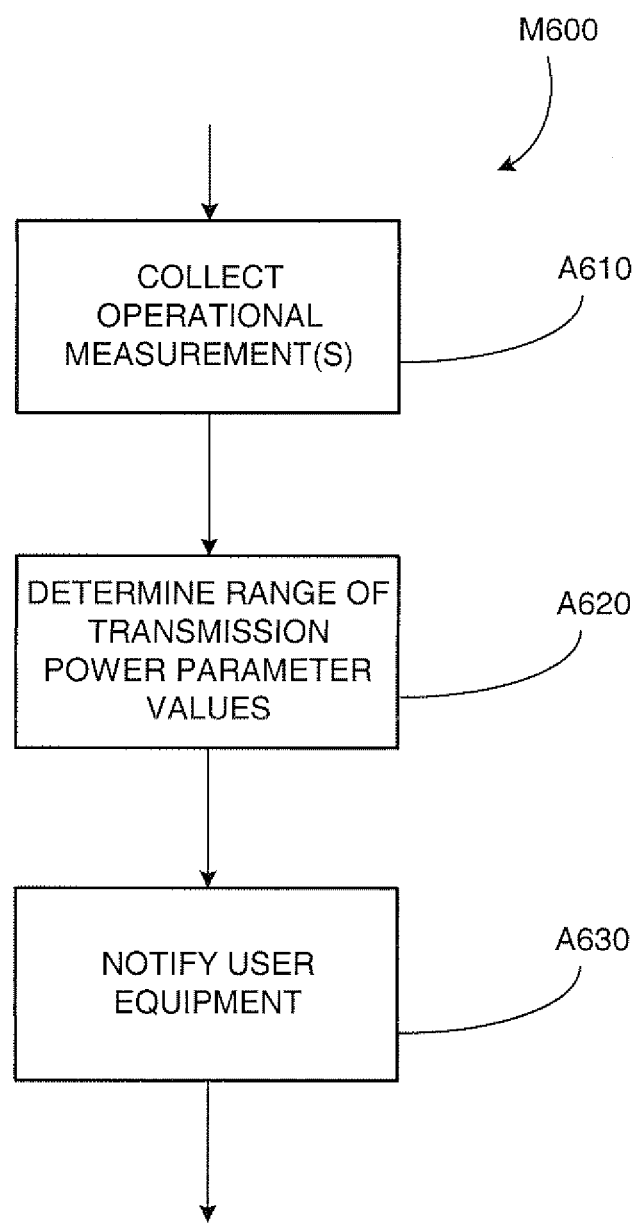
FIG. 6 illustrates a method for providing transmission parameter values for a UE.

FIG. 6 illustrates a method M600 for providing transmission parameter values for a UE 120. The method M600 may be performed by the RBS 110 and/or the RNC 130. The transmission parameter values include power offset values for the UE 120, which represents offsets relative to a transmission power of a base transmission channel. For example, the base transmission channel can be the DPCCH, and the offsets can be β-factors of the E-TFCIs for the UE 120. As indicated above, the UE 120 can use the DPCCH to transmit information to the RBS 110. Also as indicated above, the offsets can be used to set the transmission power level applied by the UE 120 on the E-DPCCH and the E-DPDCH, which can also used to transmit information from the UE 120 to the RBS 110. The transmission power applied by the UE 120 on the base transmission channel (e.g., DPCCH) may be referred to as a base channel transmission power. Also, other channels such as the EDPCCH and E-DPDCH may be referred to as non-base transmission channels and the transmission power applied by the UE 120 on the non-base transmission channels may be referred to as non-base channel transmission power.

In this method, one or more operational measurements are collected of a cell area (such as the cell 140) corresponding to the RBS 110 providing a wireless service to the 120 in A610. More specifically, in A610, the following measurements, among others, can be considered:

Interference headroom—amount of additional noise that can be tolerated—either measured at the RBS or estimated based on grants the scheduler assign to the UEs in the cell (via the E-AGCH channel for serving cell, and via E-RGCH channel for other cells).

Noise rise—amount of interference—also either measured at the RBS or estimated based on the grants the scheduler assign to the UEs in the cell (via the E-AGCH channel for the serving cell, and E-RGCH for other cells).

The network layout—may be used for deciding whether a UE will be power (coverage) limited or interference limited.

UE position—together with the network layout and system measurements the UE position is utilized to decide whether a UE may be power (coverage) limited, and hence, will not utilize larger E-TFCIs.

Time of day—During busy hour, the interference level may be continuously high even if the current estimated interference headroom is low.

Number of connected UEs—can be used together with the time of day to establish a more accurate estimation of the variation in signal strength interference.

Admission control parameters—can set a limit on the introduced interference by additional UEs, and hence may constrain the maximum size of the allowed E-TFCIs.

Type of scheduler and its parameters—depending on scheduling strategy only a few E-TFCIs may be used. For example, the delay introduced by scheduling may imply that two VoIP packets are always scheduled together, and hence a larger E-TFCI can be used.

Radio channel environment—delay spread information may be used to decide how large variations the nose rise (power requirement) might have. Different scheduling strategies will show different performance and efficiency in different radio propagation environments. Thus will noise rise levels differ between different environments.

Then in A620, a range of the transmission parameter values for the UE 120 is determined based on the operational measurements collected in A610. From one perspective, most probable and accurate power offset values for the channels E-DPCCH and E-DPDCH are derived based on the operational measurements and corresponding transmission parameter values are determined. In A620, the task of judging which transmission parameter values may be possible to use in a given time frame, e.g. an estimated user session time, according to the given inputs such as system characteristics is performed. Note that in most instances, the range of the transmission parameter values is less than an entire available range of transmission parameter values.

Figure 7:
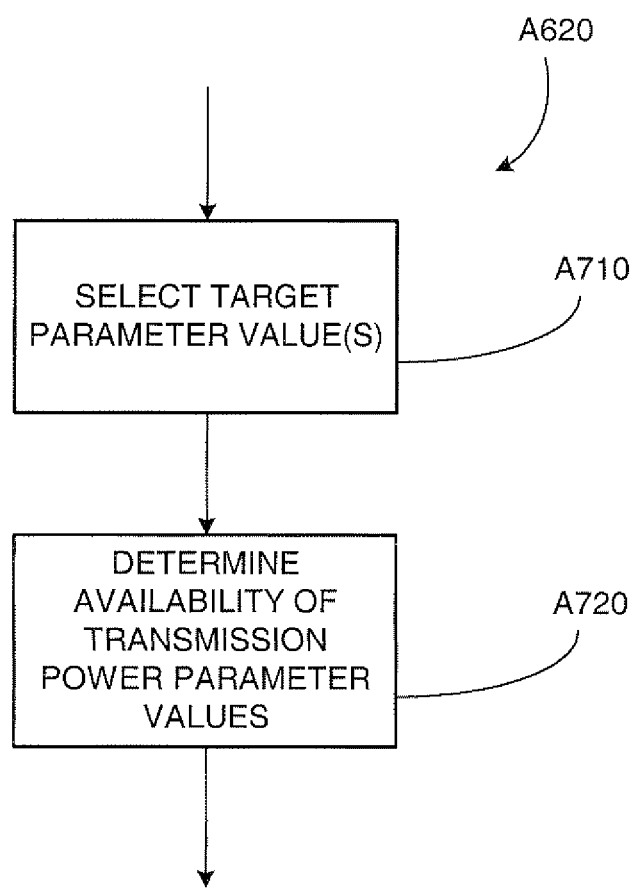
FIG. 7 illustrates a method for determining a range of transmission parameter values.

FIG. 7 illustrates an example process for performing A620. In this process, target parameter value(s) are selected in A710. The target parameter value(s) can include one or more of SIR (signal-to-interference ratio) target value, a BLER (block error rate) target value, a BER (bit error rate) target value, a HARQ (hybrid automatic retransmission request) target value, a transmission rate value, and the like. In general, any appropriate performance criteria values may be selected in A710.

Figure 8:
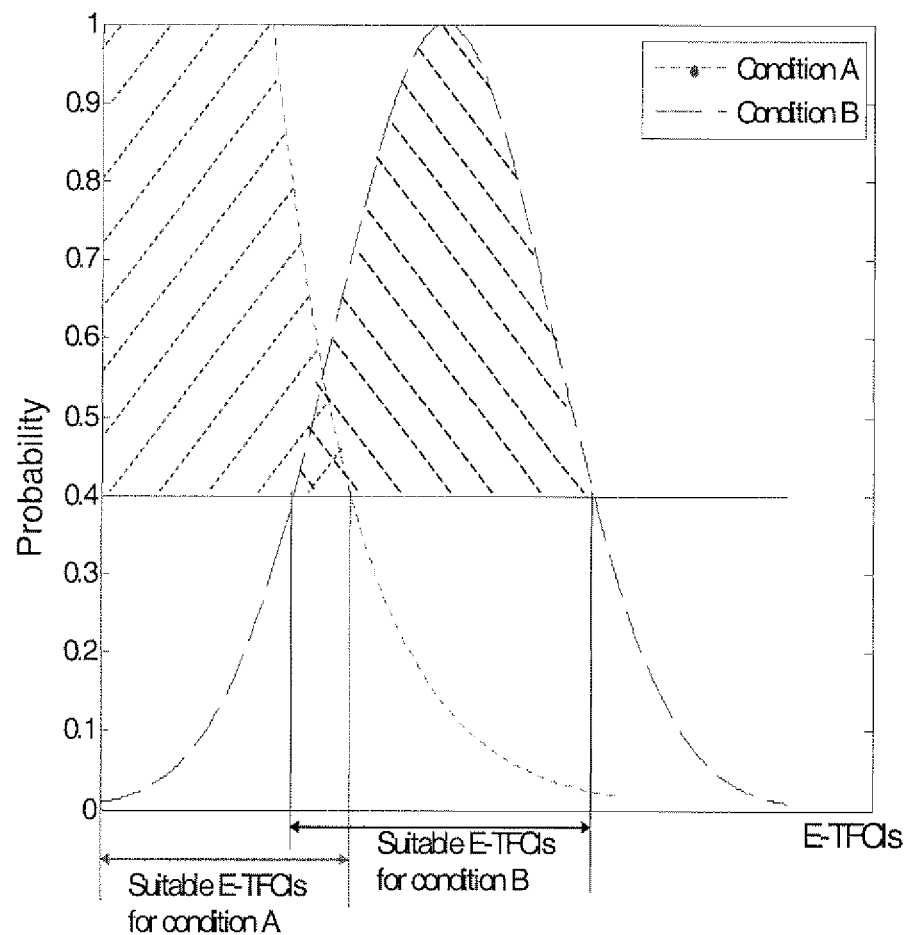
FIG. 8 illustrates a probability density function to determined the range of transmission parameter values.

In A720, availability of the transmission parameter values can be determined based on the selected target parameter value(s). One way to determine the availability can be based a probability threshold of the particular transmission parameter value being used. To state it another way, a particular E-TFCI will be determined to be available if there is at least n % (n being predetermined) chance that the E-TFCI of being used. This is illustrated in FIG. 8 which illustrates a probability density function with n set to 40%. Here, two different scenarios ("system environment" conditions) A and B are shown.

Condition A could correspond to a case with limited interference headroom, which does not allow for large E-TFCIs to be used due to their required SIR. Condition B, on the other hand, could correspond to a case where the scheduler settings are such that medium sized E-TFCIs mostly are required, due to e.g. round robin scheduling. If condition A is prevalent, then the low range of E-TFCIs, i.e., the transmission parameter values, would be determined to be available in A720. Conversely, if condition B is prevalent, then the mid range of E-TFCIs would be determined to be available.

Figure 9:
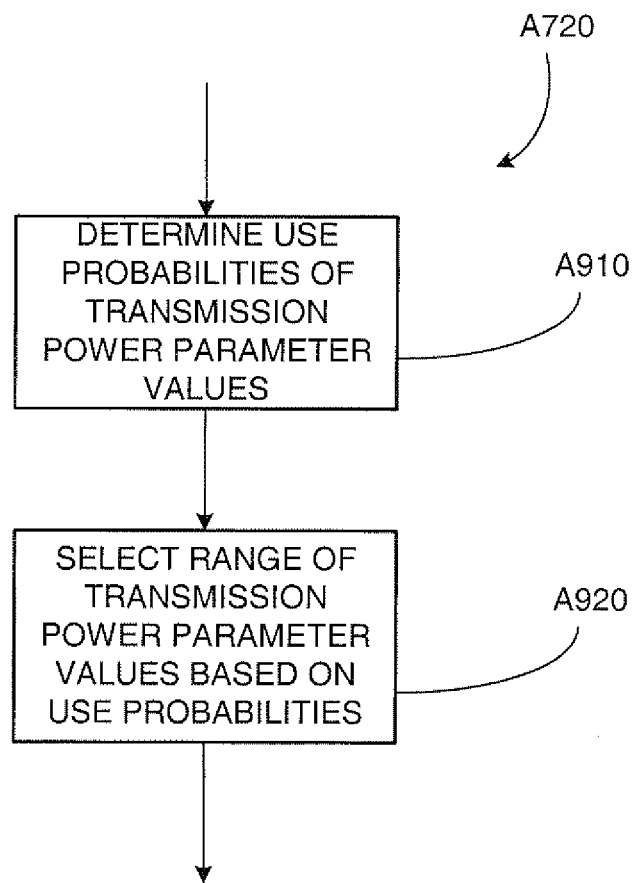
FIG. 9 illustrates a method for determining availability of transmission parameter values.

FIG. 9 illustrates an example process for performing A720. In this process, for each transmission parameter value, e.g., for each E-TFCI value, a probability that the transmission parameter value can be used is determined based on the selected target parameter values in A910. This can be done using the probability density function as illustrated in FIG. 8. However, other ways of determining probabilities may be utilized. Then in A920, the transmission parameter values whose probability of use is at or above a predetermined threshold can be selected as being available.

Figure 10:
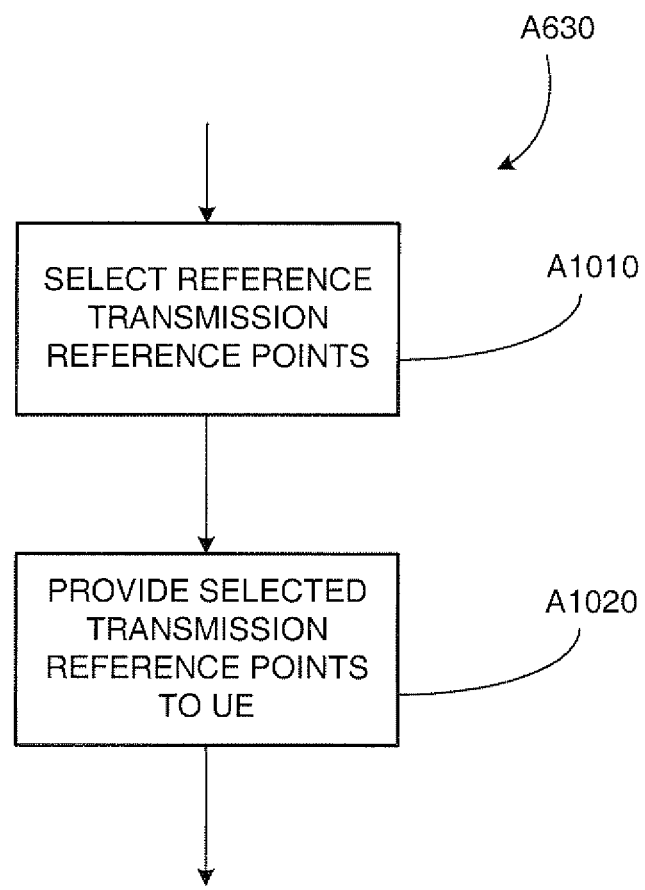
FIG. 10 illustrates a method for providing transmission power reference points to the UE.

Referring back to FIG. 6, in A630, the UE is notified of the range of range of the transmission parameter values determined in A620. FIG. 10 illustrates an example process for performing A630. In FIG. 10, a predetermined number of reference transmission parameter values are determined in A1010 based on the range of the transmission parameter values determined in A620. If the determined range is sufficiently narrow, the exact transmission parameter values can be provided.

However, in most instances, it is likely that even the determined range is wide enough so that interpolation will be required. It is desirable to select the reference points to minimize the amount of error caused by the interpolation. Some examples of selecting the reference points are illustrated in FIGS. 11A, 11B and 11C.

Figure 11A:
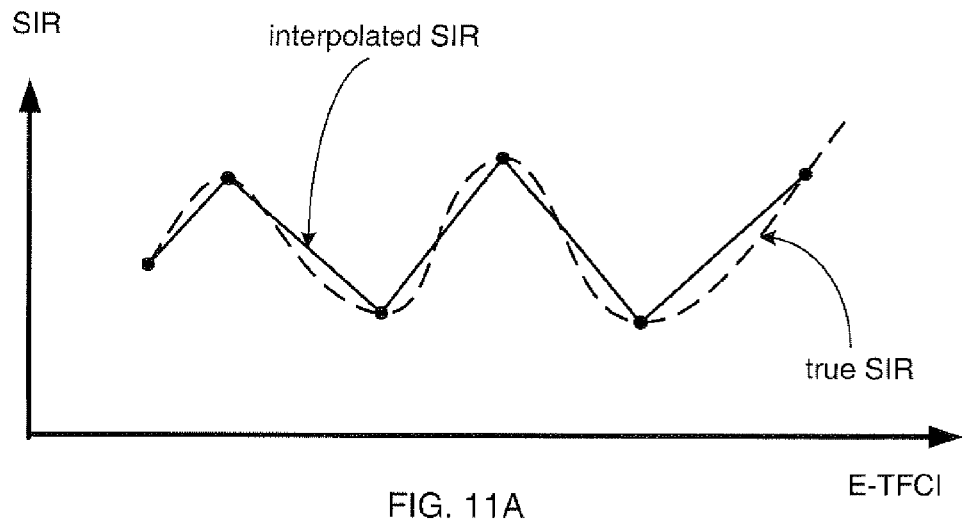
FIGS. 11A, 11B and 11C illustrate example ways of determining the transmission power reference points.

In FIG. 11A, the reference points are selected to correspond to local maximum and minimum values of true transmission parameter curve within the selected range of the transmission parameter values. In this manner, the difference between the true curve and the interpolated curve is minimized.

It is always not necessary to provide reference points that correspond to the local maximum and minimum. As illustrated in FIG. 11B, the reference points give need not correspond exactly to the actual SIR curve. Here, the objective is to simply provide the reference points so that any error due to interpolation, i.e., any absolute difference, is kept at or below a predetermined threshold. Further, the variation in the difference is minimized.

Figure 11B:
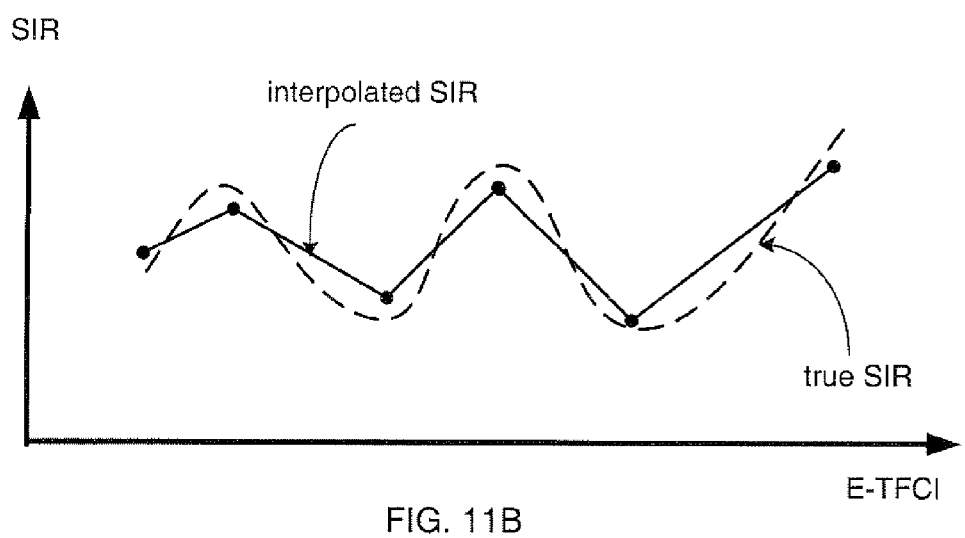
Figure 11C:
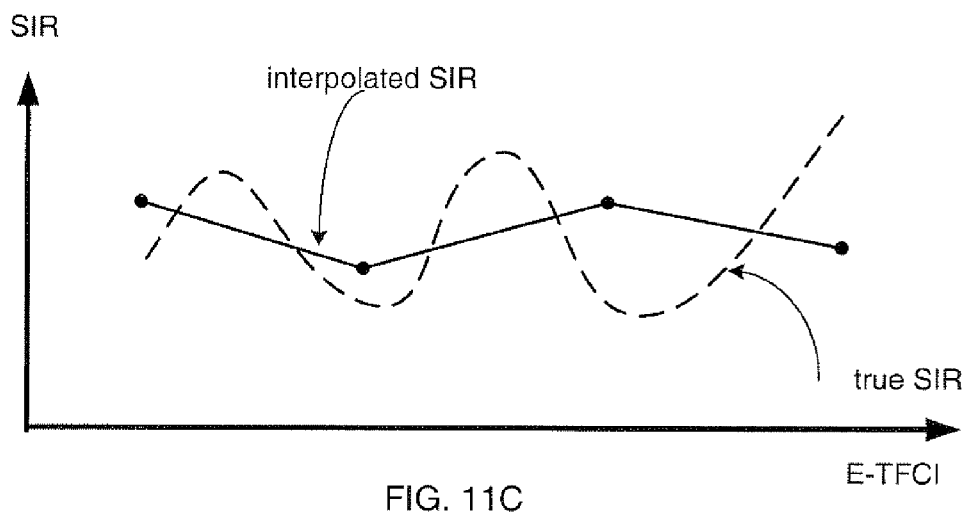

In FIGS. 11A and 11B, the number of reference points matches the number of local minimum and maximums of the true SIR curve. However, this may now always be the case—the number of reference points may be less than the number of local minimums and maximums as illustrated in FIG. 11C. Here, the goals are similar—that is, the reference points are selected so that errors caused by interpolation are minimized.

There are few items to be noted. First, the reference points provided need not be evenly spaced apart. Second, while only linear interpolations are shown, it is contemplated that higher order interpolations may be utilized to determine the reference points. Curve fitting algorithms can also be utilized.

Referring back to FIG. 10, the selected reference transmission parameter values are provided to the UE 120 in A1020.

Figure 12:
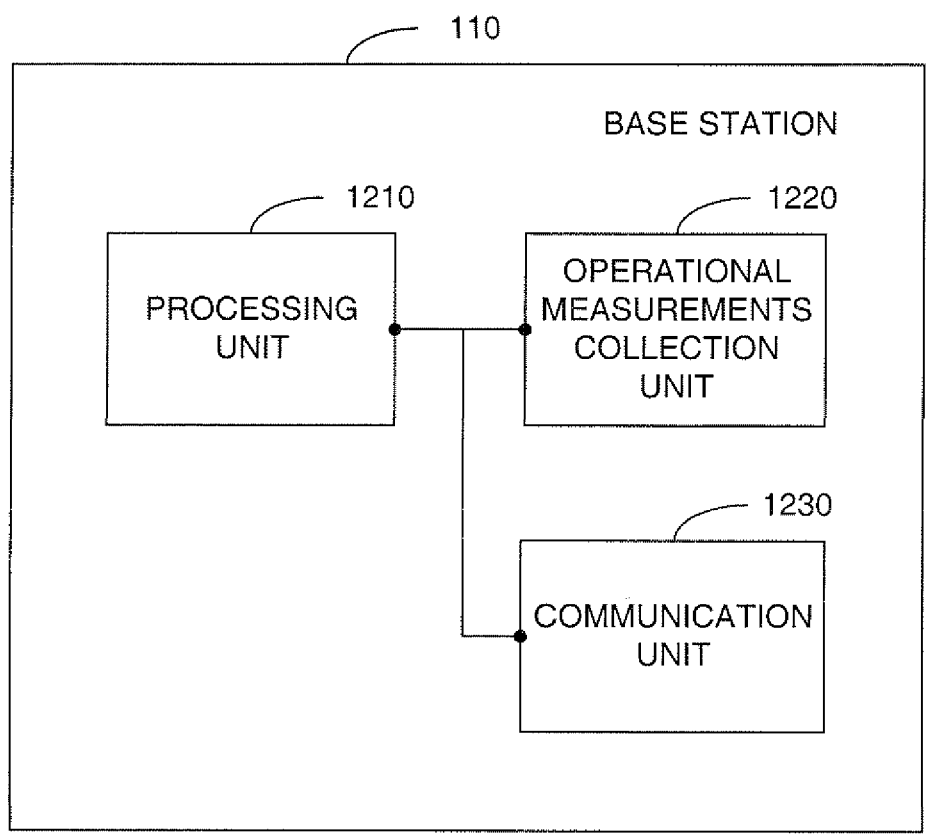
FIG. 12 illustrates an embodiment of a radio base station.

FIG. 12 illustrates an embodiment of an RBS 110. The RBS 110 includes a communication unit 1230, an operational measurements collection unit 1220, and a processing unit 1210. The communications unit 1230 is arranged to communicate with one or more UEs 120, the operational measurements collection unit 1220 is arranged to collect one or more operational measurements of a cell area corresponding to the RBS 110, and the processing unit 1210, in conjunction with the communications unit 1230 and the measurements collection unit 1220, is arranged to perform the methods and processes as described above.

Note that within a given time interval (e.g. each 5 minutes), the RBS 110 can decide what E-TFCI reference points should be used by the UEs 120 in the cell. The RBS 110 may either choose to send new E-TFCI reference points to all existing UEs 120 in the cell, or only use the new reference points for new users. As an extension, the RIBS 110 may consider applying certain power offset positions to specific UEs 120 depending, for example, on their power consumption and perceived radio environment.

Figure 13:
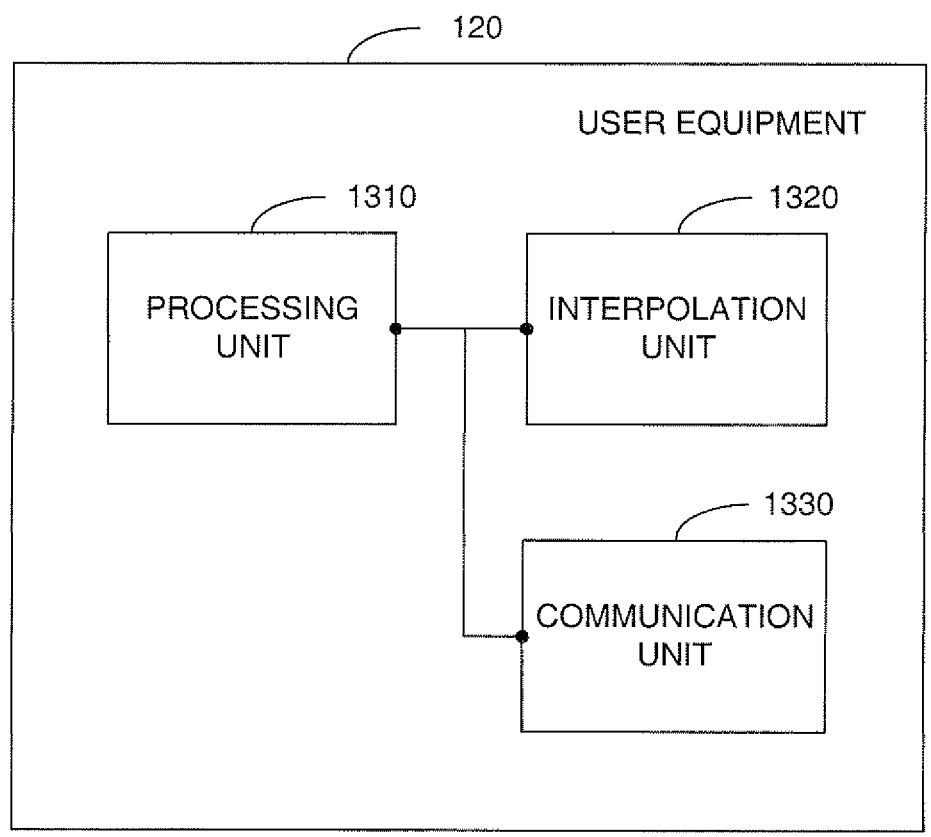
FIG. 13 illustrates an embodiment of a radio base station.

FIG. 13 illustrates an embodiment of a UE 120. The UE 120 includes a communication unit 1330, an interpolation unit 1320, and a processing unit 1310. The communications unit 1330 is arranged to communicate with a base station 110, the interpolation unit 1320 is arranged to interpolate transmission parameter values, and the processing unit 1310, in conjunction with the communications unit 1330 and the interpolation unit 1320, is arranged to perform the methods and processes as described above.

Advantages of the disclosed embodiments include at least the following. First, more suitable power offsets can be determined. Hence efficient radio resource utilization is possible. Further, higher user throughout and higher system capacity can be realized.

Although the description above contains many specificities, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly not to be limited. All structural, and functional equivalents to the elements of the above-described preferred embodiment that are known to those of ordinary skill in the art are expressly incorporated herein by reference and are intended to be encompassed hereby. Moreover, it is not necessary for a device or method to address each and every problem described herein or sought to be solved by the present technology, for it to be encompassed hereby. Furthermore, no element, component, or method act in the present disclosure is intended to be dedicated to the public. Yet further, in the method claims, the order of acts are not necessarily meant to convey that the acts are to be performed in any specific order.

What is claimed is:

1. A method performed at a base station in a wireless network, comprising:
   collecting one or more operational measurements of a cell area corresponding to the radio base station providing a wireless service to a user equipment;
   determining a range of transmission parameter values for the user equipment based on the collected one or more operational measurements;
   selectin a predetermined number of reference transmission parameter values based on the range of the transmission parameter values, the predetermined number being at least two; and
   providing the selected predetermined number of reference transmission parameter values to the user equipment,
   wherein the range of transmission parameter values are for use by the user equipment to determine one or more transmission parameters to be applied at the user equipment when the user equipment transmits information on a channel to the base station,
   wherein an actual number of transmission parameter values in the range is greater than the predetermined number such that the range includes one or more transmission parameter values that are not included in the reference transmission parameter values, and
   wherein in the act of selecting the predetermined number of reference transmission parameter values, the reference transmission parameter values are selected in consideration of an interpolation used by the user equipment to determine the one or more transmission parameter values not included in the reference transmission parameter values.

2. The method of claim 1, wherein the transmission parameter values include power offset values for the user equipment representing offsets relative to a transmission power of a base transmission channel.

3. The method of claim 2, wherein the base transmission channel is a DPCCH (Dedicated Physical Control Channel) and the transmission parameter values include the E-TFCI (E-DCH (Enhanced Dedicated Channel) Transport Format Combination Indicator) values and the power offset values include the β-factors of the E-TFCI values for the user equipment.

4. The method of claim 1, wherein the operational measurements include one or more of a noise rise, an interference headroom, a network layout, a position of the user equipment, a time of day, a number of user equipments connected to the radio base station, one or more admission control parameters, one or more scheduler parameters, a radio channel environment, and a service type of the wireless service being provided to the user equipment.

5. The method of claim 1, wherein the act of determining the range of the transmission parameter values for the user equipment comprises:
   selecting one or more target parameter values; and
   determining availability of the transmission parameter values based on the selected one or more target parameter values.

6. The method of claim 5, wherein the one or more target parameter values include one or more of a signal-to-interference ratio (SIR) target value, a block error rate (BLER) target value, a bit error rate (BER) target value, a hybrid automatic retransmission request (HARQ) target value, and a transmission rate value.

7. The method of claim 5, wherein the act of determining the availability of the transmission parameter values comprises:
   determining, for each transmission parameter value, a probability that the transmission parameter value can be used based on the one or more selected target parameter values; and
   selecting the transmission parameter values whose probability of use is at or above a predetermined threshold.

8. The method of claim 7, wherein the transmission parameter values are E-TFCI values.

9. The method of claim 1, wherein in the act of selecting the predetermined number of reference transmission parameter values, the reference transmission parameter values are selected to include local maximum and minimum values of true transmission parameter values within the range of the transmission parameter values.

10. The method of claim 1, wherein in the act of selecting the predetermined number of reference transmission parameter values, the reference transmission parameter values are selected such that:
   absolute differences between interpolated transmission parameter values and true transmission parameter values are at or below a predetermined difference threshold, and
   variations of the true transmission parameter values above and below the interpolated transmission parameter values are substantially equalized,
   where the interpolated transmission parameter values are determined based on the reference transmission parameter values.

11. The method of claim 10, wherein
   the interpolated transmission parameter values are determined based on linearly interpolating between the reference transmission parameter values, or
   the interpolated transmission parameter values are determined by applying a predetermined curve fitting algorithm on the reference transmission parameter values.

12. The method of claim 1, wherein the determined range of the transmission parameter values is less than an entire available range of transmission parameter values.

13. A radio base station, comprising:
   a communications unit arranged to communicate with a user equipment;
   an operational measurements collection unit arranged to collect one or more operational measurements of a cell area corresponding to the radio base station; and
   a processing unit arranged to control the operational measurements collection unit and the communications unit to provide wireless service to the user equipment,
   wherein the processing unit is arranged to:
      determine a range of the transmission parameter values for the user equipment based on the one or more operational measurements collected by the operational measurements collection unit,
      select a predetermined number of reference transmission parameter values based on the range of the transmission parameter values, and,
      provide, via the communications unit, the selected predetermined number of reference transmission parameter values to the user equipment,
   wherein the range of transmission parameter values are for use by the user equipment to determine one or more transmission parameters to be applied at the user equipment when the user equipment transmits information on a channel to the base station,
   wherein an actual number of transmission parameter values in the range is greater than the predetermined number such that the range includes one or more transmission parameter values that are not included in the reference transmission parameter values, and
   wherein the processing unit is arranged to select the predetermined number of reference transmission parameter values in consideration of an interpolation used by the user equipment to determine the one or more transmission parameter values not included in the reference transmission parameter values.

14. The radio base station of claim 13, wherein the transmission parameter values include power offset values representing offsets relative to a transmission power of a base transmission channel.

15. The radio base station of claim 14, wherein the base transmission channel is a DPCCH (Dedicated Physical Control Channel) and the power offset values includes E-TFCI (E-DCH (Enhanced Dedicated Channel) Transport Format Combination Indicator) values for the user equipment.

16. The radio base station of claim 13, wherein the operational measurements include one or more of a noise rise, an interference headroom, a network layout, a position of the user equipment, a time of day, a number of user equipments connected to the radio base station, one or more admission control parameters, one or more scheduler parameters, a radio channel environment, and a service type of the communication service being provided to the user equipment.

17. The radio base station of claim 13, wherein the processing unit is further arranged to:
   select one or more target parameter values, and
   determine availability of the transmission parameter values based on the selected one or more target parameter values.

18. The radio base station of claim 17, wherein the one or more target parameter values include one or more of a signal-to-interference ratio (SIR) target value, a block error rate (BLER) target value, a bit error rate (BER) target value, a hybrid automatic retransmission request (HARQ) target value, and a transmission rate value.

19. The radio base station of claim 17, wherein the processing unit is further arranged to:
   determine, for each transmission parameter value, a probability that the transmission parameter value can be used based on the one or more selected target parameter values, and
   select the transmission parameter values whose probability of use is at or above a predetermined threshold.

20. The radio base station of claim 19, wherein the transmission parameter values are E-TFCI values.

21. The radio base station of claim 13, in that the processing unit is further arranged to select the reference transmission parameter values to include local maximum and minimum values of true transmission parameter values within the range of the transmission parameter values.

22. The radio base station of claim 13, the processing unit is arranged to select the reference transmission parameter values such that:
   absolute differences between interpolated transmission parameter values and true transmission parameter values are at or below a predetermined difference threshold, and
   variations of the true transmission parameter values above and below the interpolated transmission parameter values are substantially equalized,
   where the interpolated transmission parameter values are determined based on the reference transmission parameter values.

23. The radio base station of claim 22, wherein
   the interpolated transmission parameter values are determined based on linearly interpolating between the reference transmission parameter values, or
   the interpolated transmission parameter values are determined by applying a predetermined curve fitting algorithm on the reference transmission parameter values.

24. The radio base station of claim 13, wherein the range of the transmission parameter values determined by the processing unit is less than an entire available range of transmission parameter values.

25. The method of claim 1,
wherein the range of transmission parameter values comprises a predetermined number of index values, each index value being an index to a table of transmission parameter values, the table being accessible by the user equipment, and
wherein a range of the index values represented by the predetermined number of index values is less than an entire range of index values in the table.

26. The method of claim 25,
wherein the range of transmission parameter values further comprises one or more power offset values representing offsets relative to the base channel transmission power to be applied by the user equipment on a base transmission channel when the user equipment transmits information on the base channel to the base station, and
wherein the power offset value(s) are for use by the user equipment to set a non-base channel transmission power to be applied by the user equipment on a non-base transmission channel when the user equipment transmits information on the non-base channel to the base station.

27. The method of claim 26, wherein the predetermined number of index values are a predetermined number of E-TFCI values, the base channel is DPCCH, and the non-base channel is E-DPDCH.

28. The radio base station of claim 13,
wherein the range of transmission parameter values comprises a predetermined number of index values, each index value being an index to a table of transmission parameter values, the table being accessible by the user equipment, and
wherein a range of the index values represented by the predetermined number of index values is less than an entire range of index values in the table.

29. The radio base station of claim 28,
wherein the range of transmission parameter values further comprises one or more power offset values representing offsets relative to the base channel transmission power to be applied by the user equipment on a base transmission channel when the user equipment transmits information on the base channel to the base station, and
wherein the power offset value(s) are for use by the user equipment to set a non-base channel transmission power to be applied by the user equipment on a non-base transmission channel when the user equipment transmits information on the non-base channel to the base station.

30. The radio base station of claim 29, wherein the predetermined number of index values are a predetermined number of E-TFCI values, the base channel is DPCCH, and the non-base channel is E-DPDCH.

* * * * *

UNITED STATES PATENT AND TRADEMARK OFFICE
CERTIFICATE OF CORRECTION

PATENT NO. : 8,554,257 B2
APPLICATION NO. : 12/191101
DATED : October 8, 2013
INVENTOR(S) : Hannu et al.

Page 1 of 2

It is certified that error appears in the above-identified patent and that said Letters Patent is hereby corrected as shown below:

On the Title Page, in item (75), under "Inventors", in Column 1, Line 1, delete "Luleá" and insert -- Luleå --, therefor.

On the Title Page, in item (75), under "Inventors", in Column 1, Line 2, delete "Luleá" and insert -- Luleå --, therefor.

On the Title Page, in item (75), under "Inventors", in Column 1, Line 3, delete "Luleá" and insert -- Luleå --, therefor.

In the Drawings

In Fig. 5D, Sheet 8 of 16, delete "E-TCFI" and insert -- E-TFCI --, therefor.

In the Specifications

In Column 2, Line 3, delete "interference" and insert -- Interference --, therefor.

In Column 2, Line 9, delete "B-TFCI" and insert -- E-TFCI --, therefor.

In Column 2, Line 25, delete "E-TCFI" and insert -- E-TFCI --, therefor.

In Column 4, Line 3, delete "CEs 120-1," and insert -- UEs 120-1, --, therefor.

In Column 6, Line 22, delete "US)" and insert -- UE) --, therefor.

In Column 8, Line 10, delete "parameters)," and insert -- parameter(s), --, therefor.

Signed and Sealed this
Fifteenth Day of April, 2014

Michelle K. Lee
*Deputy Director of the United States Patent and Trademark Office*

CERTIFICATE OF CORRECTION (continued)
U.S. Pat. No. 8,554,257 B2

In Column 8, Line 10, delete "parameters), radio" and insert -- parameter(s), radio --, therefor.

In Column 11, Line 24, delete "RIBS 110" and insert -- RBS 110 --, therefor.

In the Claims

In Column 12, Line 4, in Claim 1, delete "selectin" and insert -- selecting --, therefor.